March 26, 1940.   D. VON MIHÀLY ET AL   2,194,879
FILM APPARATUS
Filed Oct. 10, 1936
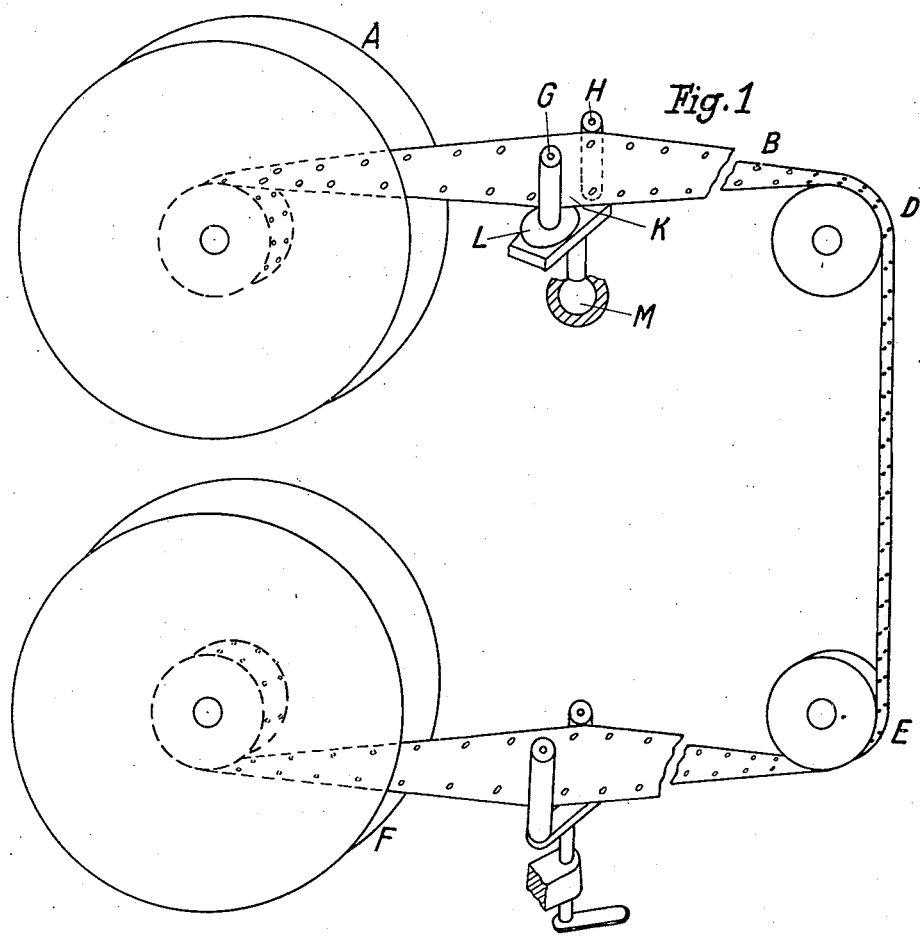
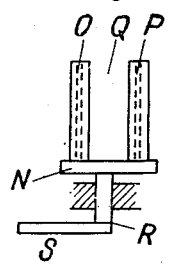
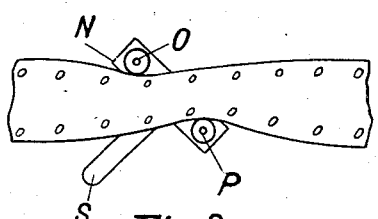

Patented Mar. 26, 1940

2,194,879

UNITED STATES PATENT OFFICE 2,194,879

FILM APPARATUS

Dénes von Mihàly, Berlin-Wilmersdorf, and Rudolf Wehler, Berlin, Germany, assignors to Julius Pintsch Kommanditgesellschaft, Berlin, Germany Application October 10, 1936, Serial No. 105,122
In Germany October 10, 1935

7 Claims. (Cl. 242—76)

The present invention relates to a film apparatus and particularly to a device provided for the purpose of guiding the film when being wound up on or off the spool.

The projection of films is effected, as known, in such a manner, that the film is wound off straight i. e. without being twisted, from the spool carrying the film, in order to be subsequently guided over rollers or the like past the window for the projection of the images on the film and possibly also past an optical slit, traversed by the light rays for reproducing the sound record on the film, to be finally wound up on another spool. The noises generated by the projection arrangement in connection therewith are, when using a standard film apparatus, not heard by the audience, in view of the fact, that the whole of the film apparatus is housed in a sound-proof manner. Such a sound-proof housing for the complete film apparatus cannot be considered, however, in connection with home film apparatus, particularly film apparatus for 16 mm. standard or narrower films, being used to an ever increasing extent, because these arrangements, intended for the use of the layman, must, at all events, be easily accessible and portable, whereas an increase of the price, such as would be connected with the provision of a sound-proof housing of this nature for the entire film apparatus, cannot be admitted offhand. On the other hand, however, a noiseless operation of the film apparatus intended for home use, particularly for the reproduction of 16 mm. standard or narrower sound films, is indispensable, because, in consequence of the small space available in this case for this purpose, any generation of noise will be particularly noticeable.

For this reason attempts have been made to suppress, as far as possible, the noises characterising the operation of home film apparatus by means of a special, constructive design of the separate parts of the film apparatus proper and satisfactory results have already been attained with regard to a noiseless drive of the film feeding device, as well as of the other mechanically moved parts. On the other hand, all attempts to eliminate the noise accompanying the winding up of the film on the corresponding spool or the winding off of the film from said spool, which noise is felt to be particularly annoying and disagreeable when suppressing the noise developed by the film apparatus proper, have proved futile up to the present. This sonorous, crackling noise can be traced back to the fact, that the side walls of the winding up and winding off spools, consisting of thin sheet metal are, as a rule, not perfectly parallel to each other, but rather uneven more or less or bent and that the spools are supported rather loosely on their driving axle. The consequence is, that the spools do not run true when revolving and that the edges of the film are made to grind on the side walls of the spools, said side walls not being perfectly parallel. Even if the spool can be made to run absolutely true, the abovementioned noise will be heard, in view of the fact, that the film can never be made to run accurately in the middle, but will exhibit the tendency of grinding first on one side wall of the spool and then on the other side wall thereof.

The present invention now relates to a method and a device, through the medium of which the sonorous, crackling noise in question will be eliminated in a simple manner. The essential, characteristic feature of the present invention consists therein, that the portion of the film, running freely between the side walls of the winding off and winding up spools, experiences during the winding off and winding up process such a twist from its plane of motion, that the edges of the film do not touch the side walls of the spools.

The twisting of the film is advantageously effected by means of a fork or a pair of rollers. In connection herewith the pair of rollers has been so arranged, that the film, when passing through between the prongs of the fork or the rollers, is twisted from its plane of motion to such an extent, that the portion of the film running freely within the corresponding spool, is made to form with the side walls of the spool an angle greater or smaller than 90°.

In order now to be able to use films of different widths, without the perpendicular distance of the prongs of the fork or of the roller axes requiring to be varied, the fork or the pair of rollers, as a further object of the present invention, is rotatably mounted. In this way it will be possible, merely by turning the fork or the pair of rollers about its axis, to vary the geometric projection of the passage slit so that, according to the position taken up by the fork or by the pair of rollers as a result of this rotary movement, the film experiences a more or less accentuated twist from its plane of motion and films of greater or lesser width can be used.

The present invention is shown, by way of example, in the accompanying drawing, in which Fig. 1 represents a film guide constructed in accordance with the present invention in combination with a film projector, whilst Figs. 2 and 3 show a further form of performance of the film guide.

In the drawing A represents the winding-off spool from which a film B is being wound off. The film B is guided over the roller D past the image window, to be subsequently guided over a roller E and to be wound up on the winding-up spool F. According to the present invention, a short distance behind the winding-off spool A and a short distance in front of the winding-up spool F, a fork having a pair of pins or a pair of rollers has been disposed, between the pins or rollers G and H of which a passage slit K for the film B is provided. At least one of the two pins or rollers carries at its lower part a shoulder L for the purpose of preventing the film slipping off. The pair of pins or rollers G, H is supported by a ball M, or any other bearing; e. g. the pair of rollers can be disposed round an ordinary axle parallel to one of the two roller axles.

It will be seen from Fig. 1, that the film B experiences in between the walls of the spools such a twist, that it can be wound off and up in a faultless manner and perfectly noiselessly without touching the side walls of the spool.

According to the form of performance represented in Figs. 2 and 3, the film guide consists of a fork N which possesses between the prongs O and P a certain passage slit Q. The fork N is pivoted on a pivot R and allows of being swivelled round this pivot by means of an arm S provided at the lower part of the fork. In this manner the geometric projection of the passage slit Q can be varied ad lib., so that according to the required conditions, the film may be more or less twisted.

What we claim is:

1. In a film apparatus a spool for winding up and off the film, the spool being provided with side walls between which the film is guided, in front of the spool and arranged upon a common carrier two cylindrical rollers being rotatable about parallel axes, a passage slit between these two rollers, through which the film is being guided when winding it up or off, the length of the cylindrical roller corresponding at least to the width of the film, the axes of the rollers being so inclined toward the axis of the film spool that the film, when passing through the slit between these two rollers, is so twisted that the portion of the film running freely within the film spool between its side walls forms an angle, differing from 90°, with said side walls of the film spool.

2. Arrangement according to claim 1, in which at least one of the two rollers is provided at its lower end with a shoulder on which the film glides when passing through the slit.

3. In a film apparatus for standard 16 mm. or narrower film a spool for winding up and off the film, the spool being provided with side walls between which the film is guided when being wound up or off, a fork arranged immediately in front of the spool between the latter and the film scanning point, the fork being pivotally supported in the space, the film passing through between the two prongs of the fork, whilst the latter is inclined towards the axis of the film spool in such a manner, that the portion of the film running freely within the spool between its side walls forms with the latter an angle which differs from 90°.

4. Arrangement according to claim 3, in which the support of the fork has been constructed as a ball bearing.

5. Arrangement according to claim 3, the fork being provided with a pivot rotatably supported in a bearing and being parallel to the prongs of the fork.

6. The combination of sound-film projection apparatus, a film spool with side walls between which the film is guided, and a forked element the bifurcation of which acts as film guide means, said fork being so inclined to the axis of rotation of said spool as to twist the film out of its normal plane of motion in passage to or from said spool, whereby to avoid the noise and friction incident to the contact of the film with the side walls of the spool.

7. Combination according to claim 6, in which said fork is arranged in the film track between the reel and a film scanning point.

DÉNES von MIHÁLY.
RUDOLF WEHLER.